R. SWARBRICK.
MECHANICAL MOVEMENT.
No. 179,078. Patented June 20, 1876.
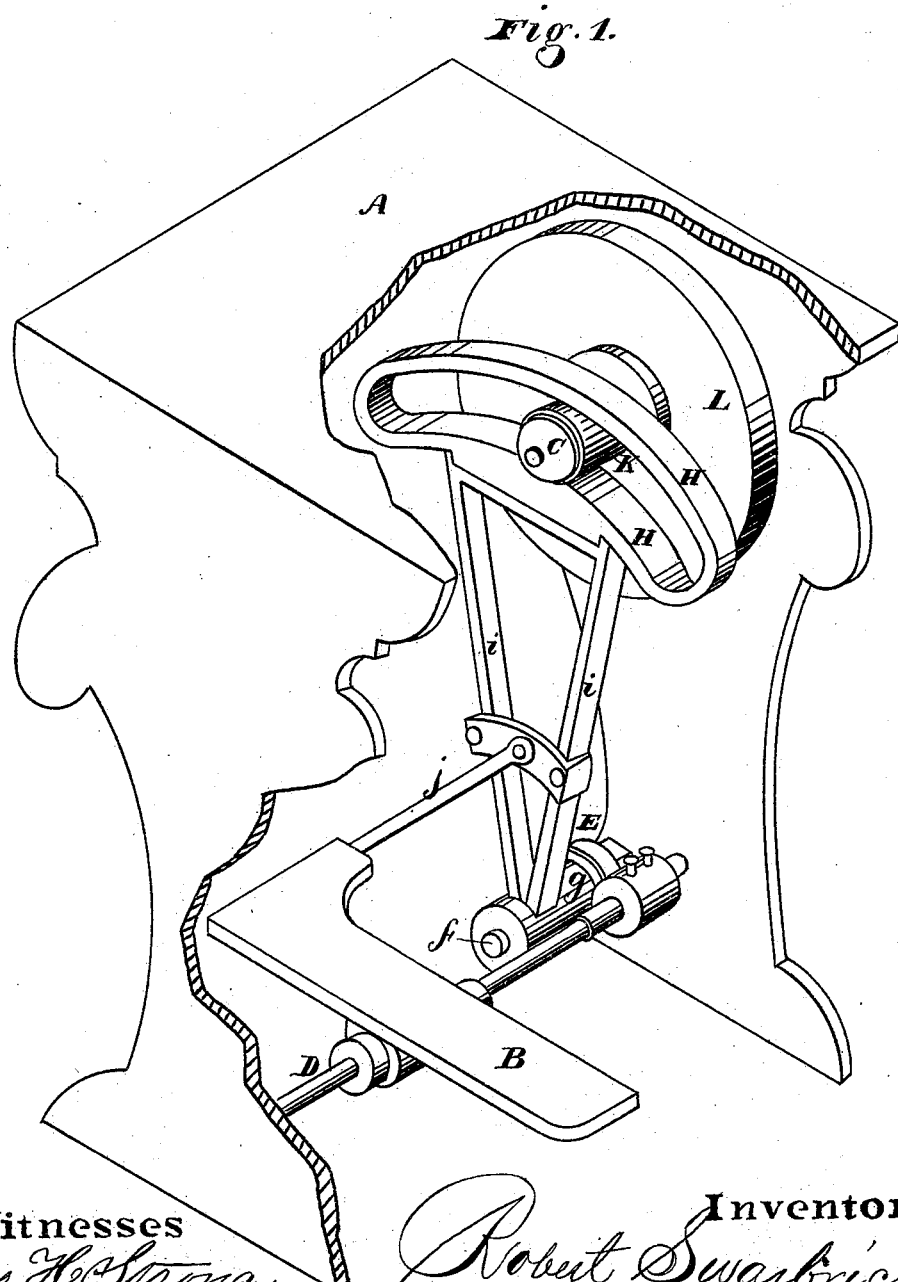

UNITED STATES PATENT OFFICE.

ROBERT SWARBRICK, OF OAKLAND, CALIFORNIA.

IMPROVEMENT IN MECHANICAL MOVEMENTS.

Specification forming part of Letters Patent No. 179,078, dated June 20, 1876; application filed May 9, 1876.

*To all whom it may concern:*

Be it known that I, ROBERT SWARBRICK, of Oakland, Alameda county, State of California, have invented an Improved Mechanical Movement; and I do hereby declare the following description and accompanying drawings are sufficient to enable any person skilled in the art or science to which it most nearly appertains to make and use my said invention without further invention or experiment.

My invention relates to an improved mechanical device for converting a treadle or reciprocating motion into a continuous rotary motion.

In the accompanying drawings I have represented my improved mechanical movement in connection with a treadle, showing how it can be used instead of a crank for driving a sewing or other similar machine, such as are ordinarily driven by foot-power.

In the drawings, Figure 1 is a perspective view of my machine.

Let A represent the table or frame of the machine. B is the treadle, which is applied in the ordinary manner on the fixed shaft D, and C is the shaft which is to be driven, and from which the power is transmitted by belt or otherwise to the machinery which is to be set in motion. Upon the fixed shaft D I place loosely a short arm, E, which has a rod or arm, *f*, secured in its opposite end parallel with the shaft D, thus forming a crank-arm. Upon this rod or arm *f* I secure loosely the hub *g*, to which the curved slotted bar or link H is connected by the arms or spokes *i i*. The arms or spokes *i i* I connect with the treadle B by means of a connecting rod or pitman, *j*, so that the up-and-down motion of the treadle will impart to the link and its arms a semi-rotary motion about the hub *g*. The shaft C passes through the slot of the link H, and has an india-rubber ferrule or band, K, secured upon it where it passes through the slot.

I use an india-rubber ferrule because, being elastic, it has greater frictional adhesion; but it is evident that other material could be used if it had sufficient adhesion.

The width of the slot is slightly greater than the diameter of the ferrule, so that when the treadle is pressed down the loose arm or crank E allows the initiatory pressure to force the upper face of the slot down upon the india-rubber ferrule. This downward pressure upon the treadle then moves the link in one direction about the hub *g* as a center. The friction of the ferrule against the upper face of the slot will give it and the shaft C a rotary motion until the ferrule arrives at the opposite end of the slot. The motion of the treadle is then reversed, so as to lift the link, and cause its lower face to catch hold of the ferrule, while the treadle moves the link back to its first position, causing the ferrule and shaft to continue their rotation in the same direction. The alternate up-and-down or reciprocating motion of the treadle thus causes the faces of the link or slotted bar to be alternately engaged with the ferrule, while the reciprocating semi-rotary motion of the link causes the shaft C to be rotated continuously in one direction by the friction between the ferrule and the moving faces of the link.

L is a balance-wheel.

A rectilinear reciprocating motion can also be converted into a continuous rotary motion by the same arrangement by causing the link to be alternately raised and depressed at the end of each stroke.

I thus produce an exceedingly simple substitute for crank motion, which can be cheaply constructed and easily operated. It has no dead-point, can be started from any position, cannot retract, and is easily adapted to all treadle-machines.

Having thus described my invention, what I claim, and desire to secure by Letters Patent, is—

The curved slotted bar or link H, connected with the fixed shaft D by the loosely-attached crank-arm E, and connected with the treadle B by means of the pitman *j*, in combination with the driving-shaft C with its india-rubber ferrule or casing *k*, substantially as and for the purposes described.

In witness whereof I have hereunto set my hand.

ROBERT SWARBRICK.

Witnesses:
WM. HOSKINS,
M. G. MORSE.